US006805407B2

United States Patent
Iliscu

(10) Patent No.: US 6,805,407 B2
(45) Date of Patent: Oct. 19, 2004

(54) TWO WAY CUSHION FLOOR LATCH

(75) Inventor: Virgil A. Iliscu, Southfield, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/365,354

(22) Filed: Feb. 12, 2003

(65) Prior Publication Data

US 2004/0051360 A1 Mar. 18, 2004

Related U.S. Application Data

(60) Provisional application No. 60/356,201, filed on Feb. 12, 2002.

(51) Int. Cl.$^7$ .............................. B60N 2/02; B60N 2/20
(52) U.S. Cl. ....................... 297/331; 297/15; 297/336; 297/378.13; 296/65.03
(58) Field of Search ........................... 297/440.22, 331, 297/335, 336, 15, 378.13; 296/65.03

(56) References Cited

U.S. PATENT DOCUMENTS

| 4,993,776 A | | 2/1991 | Acuto et al. | |
|---|---|---|---|---|
| 5,133,589 A | | 7/1992 | Kimura | |
| 5,558,386 A | | 9/1996 | Tilly et al. | |
| 5,649,783 A | * | 7/1997 | Ichikawa et al. | 297/440.22 |
| 5,711,505 A | | 1/1998 | Nemoto | |
| 5,779,308 A | | 7/1998 | Kim | |
| 6,155,639 A | * | 12/2000 | Frolo | 297/331 |
| 6,250,703 B1 | | 6/2001 | Cisler et al. | |
| 6,623,071 B2 | * | 9/2003 | Kawamoto et al. | 297/440.22 |
| 6,655,724 B1 | * | 12/2003 | Yoshino et al. | 296/65.03 |

* cited by examiner

Primary Examiner—Anthony D. Barfield
(74) Attorney, Agent, or Firm—Clark Hill PLC

(57) ABSTRACT

A latch assembly secures a striker of a seat cushion to a floor of a motor vehicle. The latch assembly includes a hinge bracket fixedly secured to the floor. The hinge bracket defines an elongated slot for receiving the striker therethrough. The latch assembly also includes a retainer mechanism coupled to the hinge bracket. The retainer mechanism selectively locks the striker within the elongated slot to secure the seat cushion in a passenger supporting position generally horizontal relative to the floor.

12 Claims, 4 Drawing Sheets

US 6,805,407 B2

TWO WAY CUSHION FLOOR LATCH

RELATED APPLICATION

This patent application claims priority to and all the benefits of U.S. Provisional Patent Application No. 60/356,201 filed on Feb. 12, 2002 and entitled "Two Way Cushion Floor Latch".

BACKGROUND OF THE INVENTION

1. Field of the Invention

This invention relates to a latch assembly for a seat of a motor vehicle. More particularly, the invention relates to a latch assembly for releasably securing a seat cushion to a floor of a motor vehicle.

2. Description of the Related Art

The availability of a large amount of storage space within a motor vehicle interior is a highly desirable feature for many vehicle owners. For this reason, seats within a passenger compartment of the motor vehicle are often movable between an upright passenger supporting position and a stowed position. A rear seat may be moved from the passenger supporting position to the stowed position by pulling a seat cushion, which is initially generally horizontal relative to a vehicle floor, upwardly and outwardly away from a seat back so that the seat cushion is generally perpendicular to the floor. The seat back is then folded into the space vacated by the seat cushion to create a table for loading of various items thereon.

It is desirable for the seat cushion to be securely locked to the floor when the rear seat is in the passenger supporting position. Current locking methods include attaching a steel or plastic clip to a floor bracket on the floor. The clip engages a striker, which extends downwardly from a bottom surface of the seat cushion, to maintain the seat cushion generally horizontal relative to the floor. The clips utilized are not, however, adaptable to small variances in striker location, striker diameter differences, clip dimensions, and shape variances. As a result, the engagement between the clip and the striker may be too tight or loose. If the attachment of the striker to the clip is too tight, a great deal of manual effort is required to effect the attachment. And if the attachment is loose, rattling and squeaking occurs as the clip and the striker move relative to one another during motor vehicle operation.

For example, U.S. Pat. No. 4,993,776 discloses a device for selectively disengaging a coupling between a seat and a floor of a motor vehicle. The seat, which is mounted on the floor, includes a seat cushion and a seat back projecting upwardly from the a rear region of the seat cushion. The seat cushion, which is supported by a metal framework, is mounted on the floor by hinge units fixed to a front end of the framework. A hooked element is fixed to the floor beneath a rear region of the framework. The framework of the seat cushion has a recess with an edge facing a tip of the hooked element. A coupling element, which is 8-shaped, includes an outer loop and an inner loop. The outer loop surrounds the tip of the hooked element. The coupling element is also fixed to the framework. When the coupling element is in a rest position, any forward tilting of the seat cushion is prevented by engagement of the coupling element around the hooked element. A flexible tie is fitted around the inner loop of the coupling element. An opposite end of the tie extends between a gap between a rear edge of the seat cushion and a lower edge of the seat back. The pulling of the tie enables the coupling element to bend so as to release the outer loop from the top of the hooked element. As a result, the seat cushion is released from the floor and can be tilted upwards and forward.

There remains, however, a need for a more secure connection between a seat cushion and a floor of a motor vehicle when a rear seat is in a passenger supporting position.

SUMMARY OF THE INVENTION

A latch assembly is provided for securing a striker of a seat cushion to a floor of a motor vehicle. The latch assembly includes a hinge bracket fixedly secured to the floor. The hinge bracket includes an elongated slot for receiving the striker therethrough. The latch assembly also includes a retainer mechanism coupled to the hinge bracket. The retainer mechanism selectively locks the striker within the elongated slot to secure the seat cushion in a passenger supporting position generally horizontal relative to the floor.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
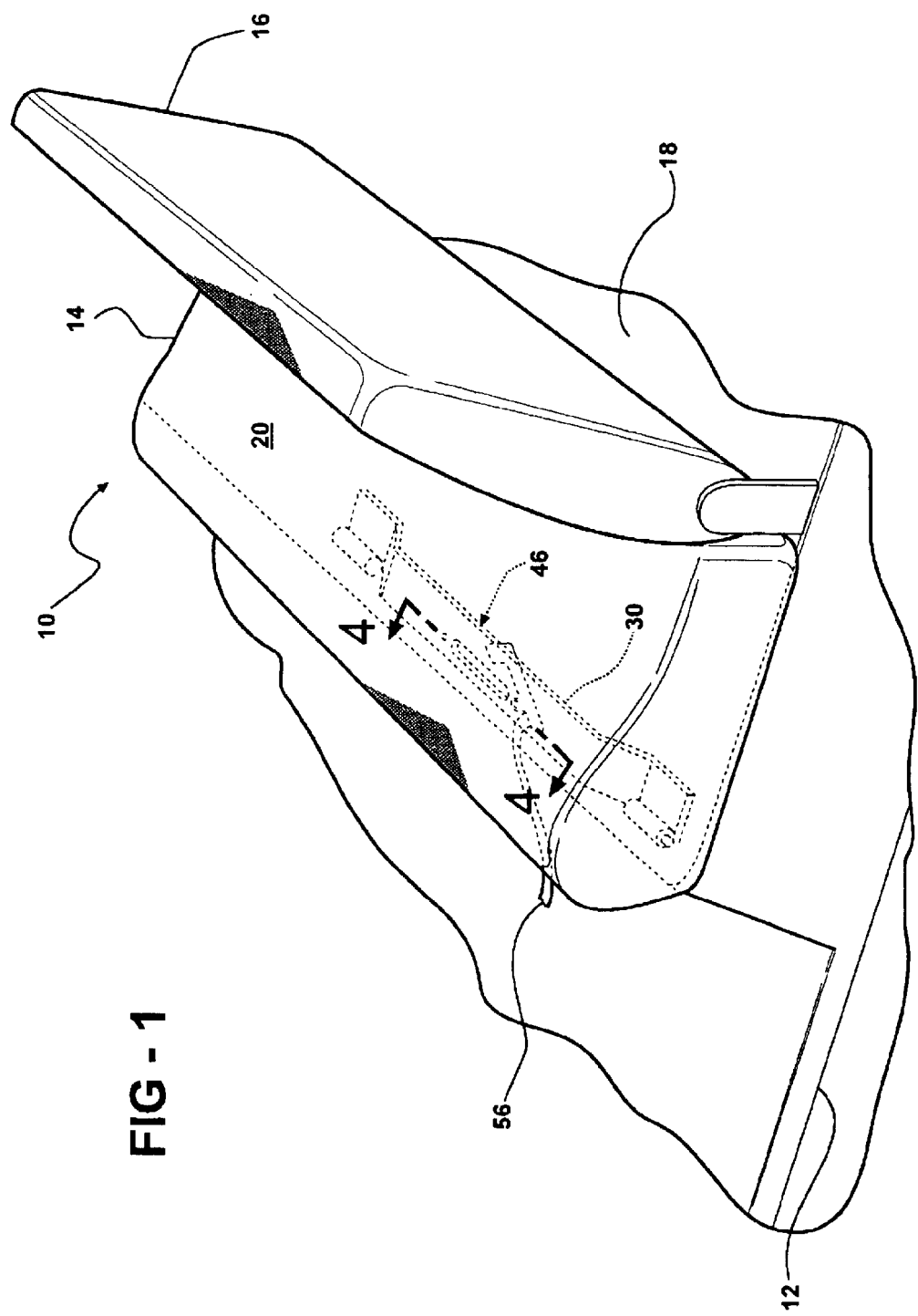
FIG. 1 is a perspective view of a seat including a seat cushion retained in a passenger supporting position by a latch assembly according to the invention.

Referring to FIG. 1, a rear seat, generally shown at 10, of a motor vehicle 12 includes a seat cushion 14 and a seat back 16. The rear seat 10 extends along a floor 18, and both the seat cushion 14 and the seat back 16 are movable relative thereto. More specifically, the seat cushion 14 moves between a passenger supporting position generally parallel to the floor 18, as shown in FIG. 1, and a stowed position generally perpendicular to the floor 18, as shown in FIG. 2.

Figure 2:
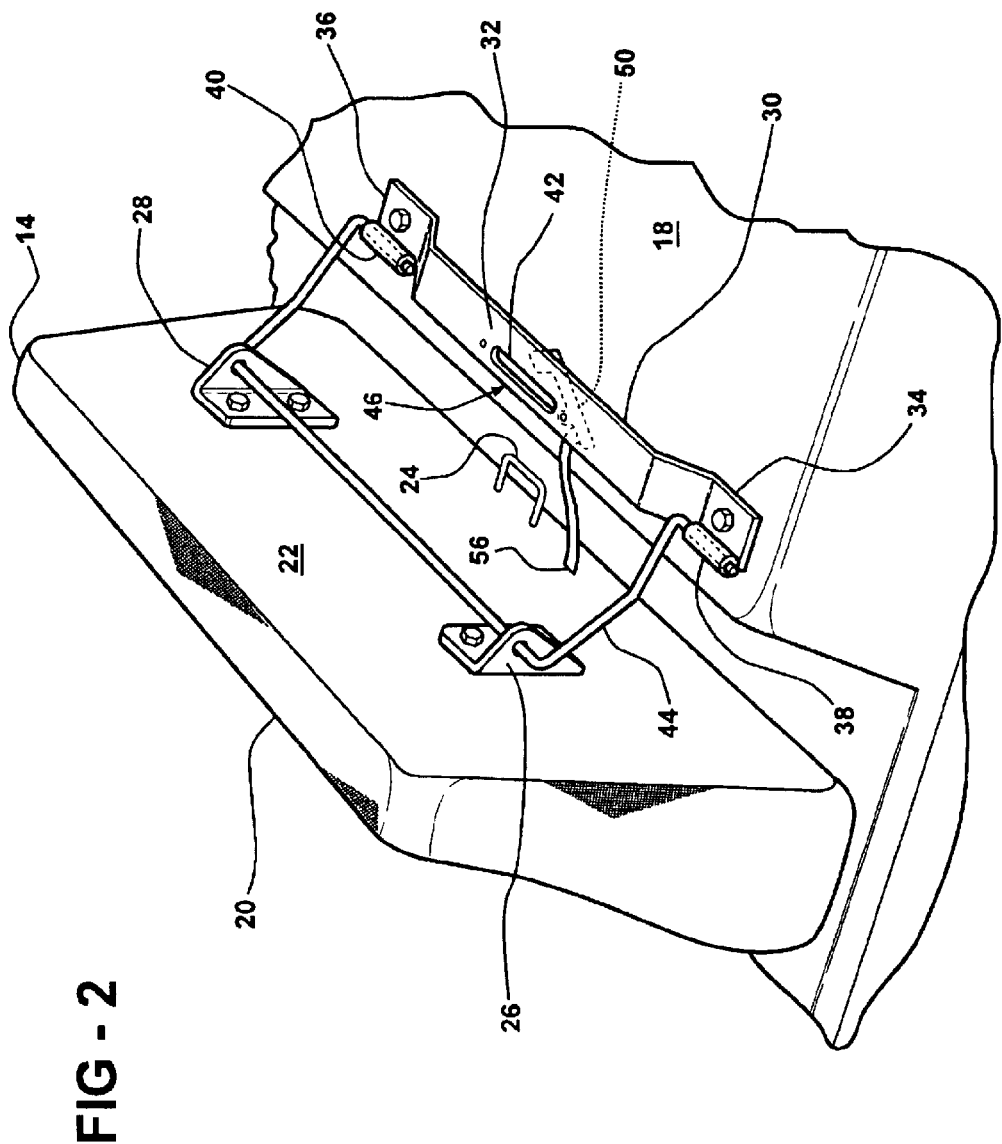
FIG. 2 is a perspective view of the seat cushion in a stowed position and having a striker extending out from a bottom surface thereof.

Referring now to FIG. 2, the seat cushion 14 includes a top surface 20 for supporting an occupant thereon and an opposing bottom surface 22. A striker 24, which is preferably a U-shaped member, extends out from the bottom surface 22. The striker 24 may be molded with the seat cushion 14 to ensure a secure attachment therewith. A pair of hinge supporting brackets 26, 28 are also mounted along the bottom surface 22 of the seat cushion 14.

A hinge bracket 30 is mounted along the floor 18. The hinge bracket 30 includes a raised center portion 32 extending between hinge ends 34, 36. The hinge ends 34, 36 are disposed along the floor 18 and are secured thereto by conventional fasteners. The hinge ends 34, 36 include respective pivot mounts 38, 40. The center portion 32 includes an elongated slot 42. The elongated slot 42 is sized to receive the striker 24 therethrough.

A hinge mechanism 44 extends between the hinge bracket 30 and the hinge supporting brackets 26, 28 along the bottom surface 22 of the seat cushion 14. The hinge mechanism 44 pivots about the pivot mounts 38, 40, thereby moving the seat cushion 14 between the passenger supporting and stowed positions. When the seat cushion 14 is in the stowed position, the seat back 16 may be folded over the space vacated by the seat cushion 14 to provide additional storage space within the motor vehicle 12.

Figure 3:
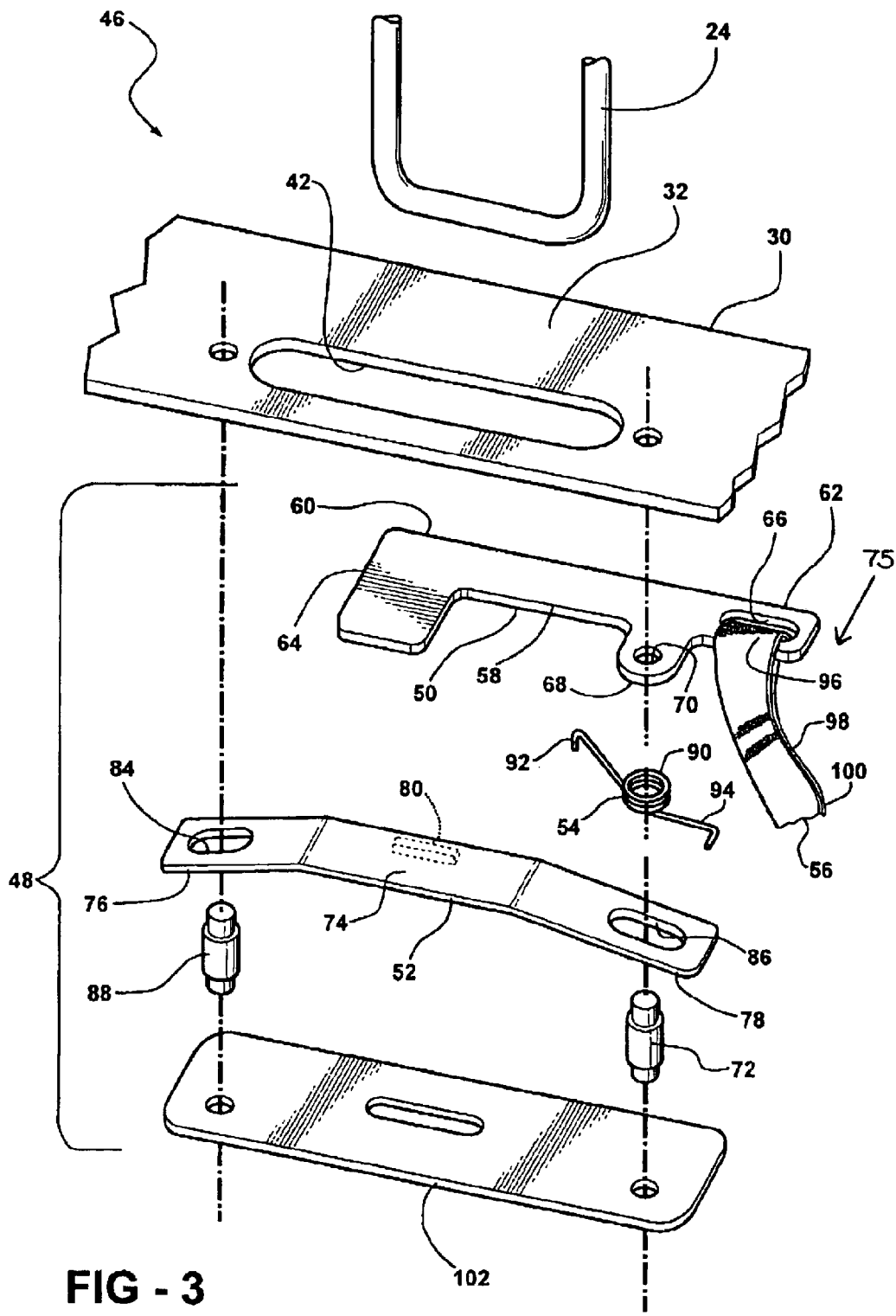
FIG. 3 is an exploded perspective view of the latch assembly according to the invention.
Figure 4:
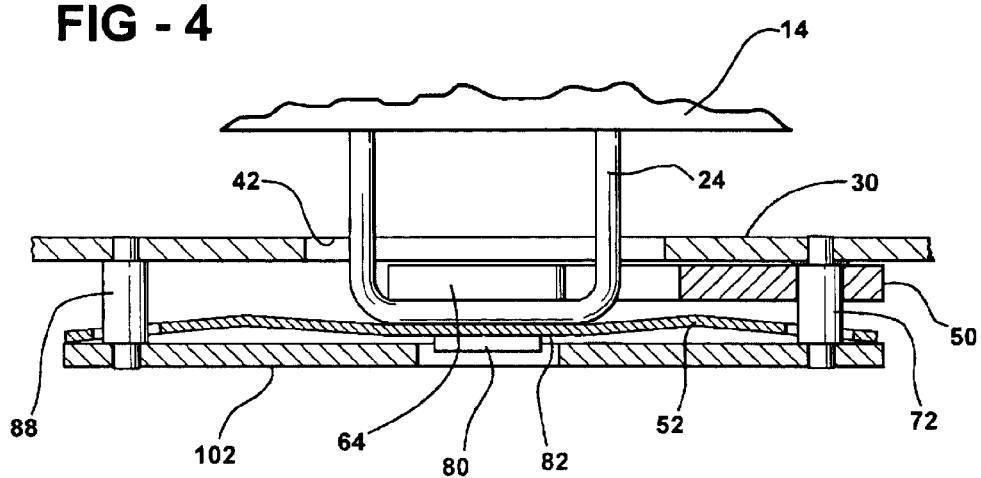
FIG. 4 is an elevational view of the latch assembly wherein a lever thereof captures the striker.
Figure 5:
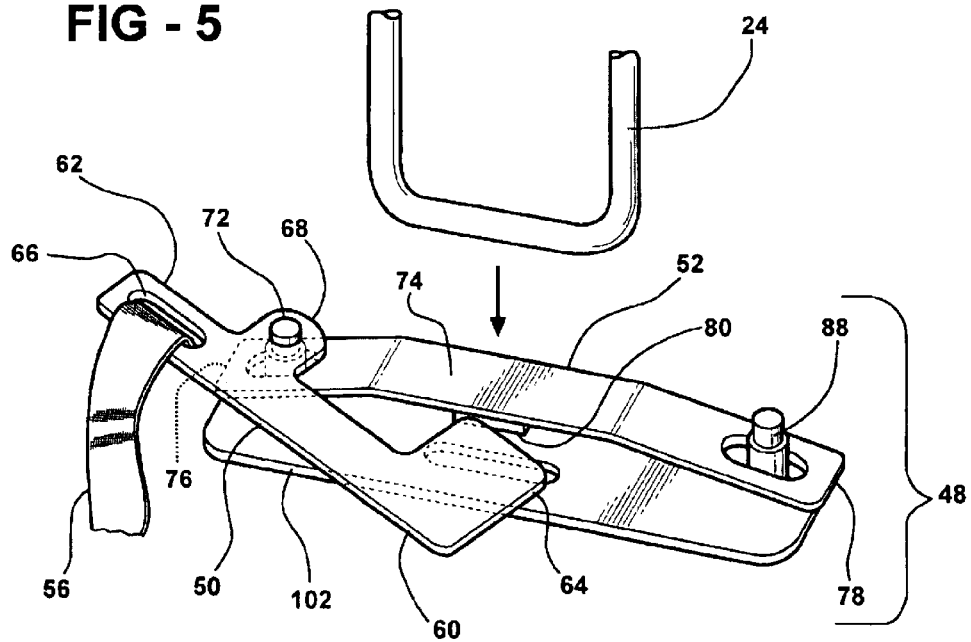
FIG. 5 is a fragmentary rear perspective view of the latch assembly with the striker released from the lever.

Referring to FIGS. 2 and 3, a latch assembly, generally shown at 46, releasably secures the striker 24 to the hinge bracket 30 mounted along the floor 18. The latch assembly 46 includes a retainer mechanism, generally shown at 48, that is coupled to the hinge bracket 30 for capturing and releasing the striker 24. The retainer mechanism 48 includes a lever 50, a spring plate 52, a torsion spring 54, and a pull strip 56. The lever 50 includes a base 58 extending between an arm end 60 and a release end 62. The arm end 60 defines a lever arm 64. The release end 62 defines an opening 66 through which the pull strip 56 is looped. The base 58 also includes an extension 68 extending out therefrom. The extension 68 includes an aperture 70 through which a rivet pin 72 extends to pivotally couple the lever 50 to the hinge bracket 30. The lever 50 pivots about the rivet pin 72 between a locked position in which the lever arm 64 captures the striker 24, as shown in FIG. 4, and an unlocked position in which the lever arm 64 releases the striker 24 and abuts a stop 80 on the spring plate 52, as shown in FIG. 5.

Referring to FIG. 3, the spring plate 52 includes a planar middle segment or striking surface 74 and plate ends 76, 78 extending angularly downwards therefrom. The middle segment 74 includes the stop 80 extending below a bottom surface 82 thereof. As mentioned above, the lever arm 64 abuts the stop 80 when the lever 50 is in the unlocked position. The plate ends 76, 78 include respective apertures 84, 86, through which rivet pins 72, 88 extend to couple the spring plate 52 to the hinge bracket 30.

The torsion spring 54 includes a circular base 90 and spring arms 92, 94 extending out therefrom. The rivet pin 72 extends through the circular base 90 to couple the torsion spring 54 to the lever 50 and to the spring plate 52. The torsion spring 54 biases the lever 50 towards the spring plate 52.

The pull strip 56 includes a middle segment 96 extending between ends 98, 100. The pull strip 56 is looped through the opening 66 in the release end 62 of the lever 50 so that the middle segment 96 is at least partially seated within the opening 66 and the ends 98, 100 are secured to each other. The pull strip 56 is formed from a resilient fabric material. When the pull strip 56 is pulled in the direction of arrow 75, the lever 50 rotates about the rivet pin 72 and causes the lever arm 64 to release the striker 24.

The latch assembly 46 also includes a lower plate 102 fixedly secured to the floor 18. The lower plate 102 is also coupled to the spring plate 52 by the rivet pins 72, 88. The lower plate 102 supports the retainer mechanism 48 above the floor 18 of the motor vehicle 12. In addition, the lower plate 102 prevents the floor 18 from interfering with the moving parts of the retainer mechanism 48, specifically the lever 50, the torsion spring 54, and the spring plate 52.

In operation, starting with the seat cushion 14 in the passenger supporting position, as shown in FIG. 1, and the lever 50 in the locked position wherein the lever arm 64 captures the striker 24, the pull strip 56 is pulled causing the lever 50 to pivot about the rivet pin 72. The lever arm 64 moves out of engagement with the striker 24 to release the striker 24. After releasing the striker 24, the lever arm 64 is biased into engagement with the stop 80 by the torsion spring 54, as shown in FIG. 5, and held in the unlocked position. The release of the striker 24 allows the seat cushion 14 to be moved upwards relative to the floor 18. As the seat cushion 14 moves upwards, the striker 24 moves up through the elongated slot 42 of the hinge bracket 30. The seat cushion 14 is moved upwardly and outwardly for pivoting about the hinge mechanism 44 until the seat cushion 14 reaches its stowed position generally perpendicular to the floor 18, shown in FIG. 2.

To move the seat cushion 14 from the stowed position back to the passenger supporting position, the seat cushion 14 is pivoted about the hinge mechanism 44 towards the floor 18. As the seat cushion 14 approaches the floor 18, the striker 24 passes through the elongated slot 42 of the hinge bracket 30. The striker 24 then contacts the striking surface 74 of the spring plate 52. The striker 24 exerts a force on the spring plate 52 that causes the spring plate 52 to move or flex downwardly towards the floor 18, thus freeing the lever 50 from engagement with the stop 80. The lever 50 is biased by the torsion spring 54 to move back towards the spring plate 52 so that the lever arm 64 captures the striker 24. The spring plate 52 then moves or rebounds upwardly so that the striker 24 is held into place between the lever arm 64 and the spring plate 52, as shown in FIG. 4. As a result, the seat cushion 14 is securely retained in the passenger supporting position, as shown in FIG. 1.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A latch assembly for securing a striker of a seat cushion to a floor of a motor vehicle, said latch assembly comprising:
   a hinge bracket adapted to be fixedly secured to the floor, said hinge bracket defining an elongated slot for receiving the striker therethrough; and
   a retainer mechanism including a lever coupled to said hinge bracket and having a release end and an opposing arm end defining a lever arm, said lever movable between a locked position in which said lever arm captures the striker within said elongated slot and an unlocked position in which said lever arm releases the striker, said retainer mechanism further including a spring elate selectively engaging said lever and having a striking surface for receiving the striker thereagainst after the striker passes through said elongated slot wherein said spring plate flexes downwards in response to being contacted by the striker in order to free said lever for movement into its locked position securing the seat cushion in a generally horizontal passenger supporting position relative to the floor.

2. A latch assembly as set forth in claim 1, wherein said retainer mechanism includes a torsion spring for biasing said lever towards said spring plate.

3. A latch assembly as set forth in claim 2, wherein said spring plate includes a stop for engaging and retaining said lever arm when said lever is in said unlocked position.

4. A latch assembly as set forth in claim 3 wherein said retainer mechanism includes a pull strip coupled to and extending out from said release end of said lever wherein pulling said pull strip releases the striker from said lever arm.

5. A latch assembly as set forth in claim 2 wherein said retainer mechanism includes a lower plate coupled to said spring plate and adapted to be fixedly secured to the floor for supporting said retainer mechanism thereabove.

6. A latch assembly for removably securing a seat cushion having a bottom surface to a floor of a motor vehicle for movement between a passenger supporting position and a stowed position, said latch assembly comprising:

a striker extending out from the bottom surface of the seat cushion;

a hinge bracket adapted to be fixedly secured to the floor and including an elongated slot for receiving said striker therethrough; and a retainer mechanism coupled to said hinge bracket for selectively locking said striker within said elongated slot of said hinge bracket to secure the seat cushion in the passenger supporting position, said retainer mechanism including a lever pivotally coupled to said hinge bracket for movement between a locked position engaging said striker to lock the seat cushion in the passenger supporting position and an unlocked position disengaged from said striker to allow movement of the seat cushion to the stowed position, said retainer mechanism further including a spring plate coupled to said hinge bracket for selectively retaining said lever in said unlocked position wherein said spring plate flexes downwards in response to being contacted by said striker in order to free said lever for movement into its locked position securing the seat cushion in a generally horizontal passenger supporting position relative to the floor.

7. A latch assembly as set forth in claim 6 wherein said lever includes a release end and an opposing arm end defining a lever arm wherein said lever arm captures said striker when said lever is in said locked position.

8. A latch assembly as set forth in claim 7 wherein said spring plate includes a striker surface for receiving said striker after said striker passes through said elongated slot of said hinge bracket.

9. A latch assembly as set forth in claim 8 wherein said retainer mechanism includes a torsion spring for biasing said lever towards said spring plate.

10. A latch assembly as set forth in claim 9 wherein said spring plate includes a stop for engaging said lever arm when said lever is in said unlocked position.

11. A latch assembly as set forth in claim 10 wherein said retainer mechanism includes a pull strip coupled to and extending out from said release end of said lever wherein pulling said pull strip releases said striker from said lever arm.

12. A latch assembly as set forth in claim 11 wherein said retainer mechanism includes a lower plate coupled to said spring plate and adapted to be fixedly secured to the floor for supporting said retainer mechanism thereabove.

* * * * *

UNITED STATES PATENT AND TRADEMARK OFFICE
CERTIFICATE OF CORRECTION

PATENT NO.     : 6,805,407 B2
DATED          : December 19, 2004
INVENTOR(S)    : Iliescu It is certified that error appears in the above-identified patent and that said Letters Patent is hereby corrected as shown below:

<u>Title page,</u>
Item [75], Inventor, should read as follows -- Virgil A. Iliescu --.

Signed and Sealed this

Twenty-sixth Day of April, 2005

JON W. DUDAS
*Director of the United States Patent and Trademark Office*